United States Patent
Park

(10) Patent No.: US 10,015,110 B2
(45) Date of Patent: Jul. 3, 2018

(54) MULTIPLEXING DATA PACKETS OVER GENERAL PACKET RADIO SERVICE TUNNELING PROTOCOL

(71) Applicant: Sprint Communications Company L.P., Overland Park, KS (US)

(72) Inventor: Sunyong Park, Herndon, VA (US)

(73) Assignee: Sprint Communications Company L.P., Overland Park, KS (US)

( * ) Notice: Subject to any disclaimer, the term of this patent is extended or adjusted under 35 U.S.C. 154(b) by 57 days.

(21) Appl. No.: 15/185,991

(22) Filed: Jun. 17, 2016

(65) Prior Publication Data

US 2017/0366473 A1    Dec. 21, 2017

(51) Int. Cl.
| | |
|---|---|
| *H04L 12/911* | (2013.01) |
| *H04L 29/12* | (2006.01) |
| *H04L 29/06* | (2006.01) |
| *H04L 12/801* | (2013.01) |
| *H04W 88/16* | (2009.01) |

(52) U.S. Cl.
CPC ............ *H04L 47/825* (2013.01); *H04L 47/14* (2013.01); *H04L 61/2592* (2013.01); *H04L 69/22* (2013.01); *H04W 88/16* (2013.01)

(58) Field of Classification Search
CPC ... H04L 47/825; H04L 47/14; H04L 61/2592; H04L 69/22; H04W 88/16
See application file for complete search history.

(56) References Cited

U.S. PATENT DOCUMENTS

| | | | | |
|---|---|---|---|---|
| 8,971,233 | B2 * | 3/2015 | Moberg | H04B 7/155 370/315 |
| 2009/0103504 | A1 * | 4/2009 | Inumaru | H04L 12/5602 370/338 |
| 2013/0195017 | A1 * | 8/2013 | Jamadagni | H04W 28/0215 370/328 |

(Continued)

FOREIGN PATENT DOCUMENTS

CN    101388825    3/2009

OTHER PUBLICATIONS

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2; (Release 13);" 3GPP; Mar. 2016; pp. 1-295; 3GPP TS 36.300 V13.3.0; Valbonne, France.

*Primary Examiner* — Kashif Siddiqui

(57) ABSTRACT

Systems, methods, and software described herein provide enhancements for data communications between a wireless access node and a wireless network gateway. In one implementation, a method of operating a wireless network includes, in the wireless access node, wirelessly receiving data packets for wireless communication devices, and encapsulating the data packets in GPRS Tunneling Protocol (GTP) packets of a shared GTP tunnel for the plurality of wireless communication devices, wherein the GTP packets comprise GTP extension headers to multiplex the data packets in the GTP packets. The method further provides, in the wireless access node, transferring the GTP packets for delivery to a wireless network gateway, wherein the network gateway separates the data packets from the GTP packets based on the GTP extension headers.

6 Claims, 10 Drawing Sheets

(56) References Cited

U.S. PATENT DOCUMENTS

2015/0365278 A1* 12/2015 Chakrabarti ........ H04L 41/0806
370/254
2016/0072930 A1* 3/2016 Shi ...................... H04W 28/065
370/392

* cited by examiner

MULTIPLEXING DATA PACKETS OVER GENERAL PACKET RADIO SERVICE TUNNELING PROTOCOL

TECHNICAL BACKGROUND

Wireless communication networks typically include wireless access systems with equipment such as wireless access, control, and routing nodes that provide wireless communication services for wireless communication devices. A typical wireless communication network includes systems to provide wireless access across a geographic region, with wireless coverage areas associated with individual wireless access nodes. The wireless access systems exchange user communications between wireless communication devices, service providers, and other end user devices. These user communications typically include voice calls, data exchanges, web pages, streaming media, or text messages, among other communication services.

In some implementations, communication systems, such as Long Term Evolution (LTE) communication systems may employ relay nodes that can act as an intermediary between a macro LTE access node or base station and the end wireless communication devices. Accordingly, when a wireless communication device requires a communication, the device may transmit data to the relay node, which in turn, transmits the data to the macro LTE access node. Similarly, when data is to be received by the wireless communication device, the macro LTE access node may transmit data to the wireless relay node, which forwards the data to the end wireless communication device.

However, while relay nodes may provide an effective method of distributing wireless resources and signaling to wireless communication devices, it may become inefficient for the macro access node and the relay nodes to manage packets for the different wireless device communications. In particular, encapsulating data packets for individual devices may create overhead, as headers for each of the packets may use valuable resources that could otherwise be allocated to other operations.

Overview

The technology disclosed herein enhances the tunneling of data communications between wireless access nodes and network gateways. In one implementation, a method of operating a communication system to enhance data communications between a wireless access node and a wireless network gateway includes, in the wireless access node, receiving data packets, via wireless signaling, for a plurality of wireless communication devices. The method further provides, in the wireless access node, encapsulating the data packets for the plurality of wireless communication devices into a GPRS Tunneling Protocol (GTP) packet of a shared GTP tunnel for the plurality of wireless communication devices, wherein the GTP packet comprises a GTP extension header to multiplex the data packets in the GTP packet, and transferring the GTP packet for delivery to the wireless network gateway. The method further provides, in the wireless network gateway, receiving the GTP packet, and separating the data packets from the GTP packet based on the GTP extension header. The method also includes, in the wireless network gateway, transferring the data packets to corresponding network destinations for the plurality of wireless communication devices.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

TECHNICAL DISCLOSURE

Figure 1:
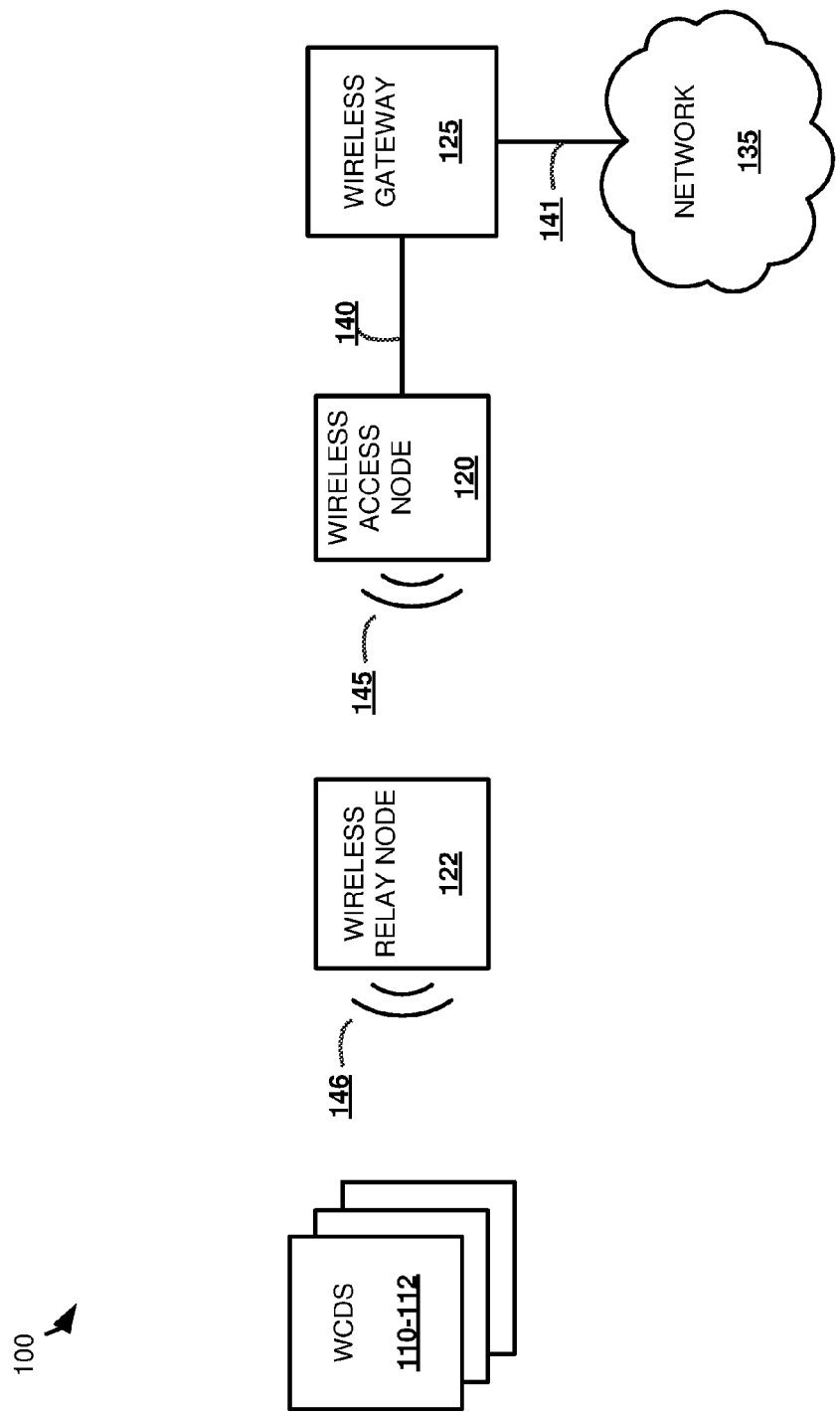
FIG. 1 illustrates a communication system to multiplex data communications between wireless access nodes and wireless gateways according to one implementation.

FIG. 1 illustrates a communication system 100 to multiplex data communications between wireless access nodes and wireless gateways according to one implementation. Communication system 100 includes wireless communication devices (WCDs) 110-112, wireless access node 120, wireless relay node 122, wireless gateway 125, and network 135. Wireless access node 120 exchanges wireless signaling 145 with wireless relay node 122, while wireless relay node 122 exchanges wireless signaling 146 with WCDs 110-112. Wireless access node 120 further communicates with wireless gateway 125 over communication link 140, and wireless gateway 125 further communicate with network 135 over communication link 141.

In operation, wireless relay node 122 is used to provide wireless communication services to applications and processes on WCDs 110-112. To provide the services, wireless relay node 122 communicates with wireless access node 120, which may comprise a macrocell eNodeB or any other similar wireless base station that connects to a Long Term Evolution (LTE) network. In particular, wireless relay node 122 may transfer an attach request to wireless access node 120, and in response to the request, wireless access node 120 may provide LTE wireless resources to wireless relay node 122, permitting the relay node to deliver wireless signaling to end wireless devices. This wireless signaling to the end wireless devices may comprise LTE signaling, WiFi signaling, or any other similar wireless communication format signaling.

Here, to provide the required communications to WCDs 110-112, the wireless access nodes, which include wireless access node 120 and wireless relay node 122, may employ General Packet Radio Service (GPRS) Tunneling Protocol (GTP). GTP is a group of IP-based communications protocols used to carry packets over Global System for Mobile Communications (GSM), Universal Mobile Telecommunications System (UMTS), and LTE networks. In particular, when a communication is received from a WCD in WCDs 110-112, wireless access node 120 and/or wireless relay node 122 may encapsulate the communication into a GTP packet before forwarding the communication across the network. This is used to separate and identify the traffic for the individual device communications. In generating the encapsulated packet with the communication for the WCD, headers and other overhead is created to provide information about the packet.

In the present implementation, rather than generating a separate GTP tunnel for each of the devices, wireless relay node 122 and/or wireless access node 120 may multiplex the communications for multiple devices into a single tunnel using GTP extension headers. In particular, the extension header may provide required metadata information to separate the individual data packets for the communications from wireless devices. This metadata information may include the number of packets that are associated with each individual communication, the overall length of the GTP payload, or any other similar information to multiplex communications from multiple devices. Once the GTP packet is transferred over the network, a wireless gateway, such as wireless gateway 125, may demultiplex the GTP packet into each of the separate data communications, and forward the data communications across network 135 to the corresponding destinations. These destinations may include other wireless devices or other end user communication devices, servers, services, or any other similar destination over network 135.

Figure 2:
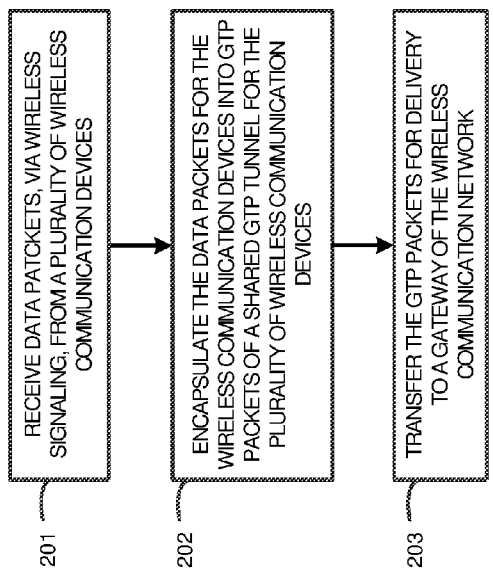
FIG. 2 illustrates a method of operating a wireless access node to multiplex data communications in GPRS Tunneling Protocol (GTP) for multiple wireless communication devices according to one implementation.

To further demonstrate the operations of communication system 100, FIG. 2 is provided. FIG. 2 illustrates a method of operating a wireless access node to multiplex data communications in GTP for multiple wireless communication devices according to one implementation. The operations of FIG. 2 are referenced parenthetically in the paragraphs that follow with reference to the systems and elements of communication system 100 in FIG. 1. In particular, the GTP multiplexing operations will be described with reference wireless relay node 122, although it should be understood that similar operations could be provided by wireless access node 120 when multiple devices are provided wireless services by wireless access node 120.

As depicted in FIG. 2, wireless relay node 122, receives data packets, via wireless signaling, from a plurality of WCDs 110-112 (201). As the data packets are received, which in some examples comprise IP packets or IP datagrams, wireless relay node 122 encapsulates the data packets for WCDs 110-112 into GTP packets of a shared GTP tunnel for the plurality of WCDs 110-112 (202). This shared GTP tunnel permits multiple wireless communications to be encapsulated in a single GTP packet, rather than using overhead to generate separate headers and tunnels for each of the communications. In particular, to encapsulate the data packets received from WCDs 110-112, wireless relay node 122 will generate a GTP extension header for each GTP packet, wherein the GTP extension header defines multiplexing information for the various communications included in the single GTP packet. This GTP extension header may include metadata that provides length information for each communication included in the packet, overall length information for the GTP packet, the number of different communications included in the GTP packet, or any other similar information to multiplex the communications from WCDs 110-112. In the particular example of communication system 100, wireless relay node 122 may generate an extension header for a GTP packet that indicates the number of communications from WCDS 110-112, the overall length of the GTP payload, and the length of each data communication for WCDs 110-112. As the GTP packets are generated, wireless relay node 122 may transfer the GTP packets for delivery to a wireless gateway, such as wireless gateways 125, for the wireless communication network (203).

Here, to transfer the GTP packets to the wireless gateway, wireless relay node 122 transfers the GTP packets to wireless access node 120, which forwards the GTP packets to the appropriate wireless gateway of the wireless network. Although not illustrated in the example of FIG. 1, it should be understood that multiple wireless devices, including wireless relay node 122, may be communicatively coupled to wireless access node 120. Accordingly, in some implementations, in addition to, or in place of the GTP multiplexing operations of wireless relay node 122, wireless access node 120 may multiplex the data communications from connected devices in a shared GTP tunnel prior to transfer the packet over the network to a corresponding wireless gateway.

Figure 3:
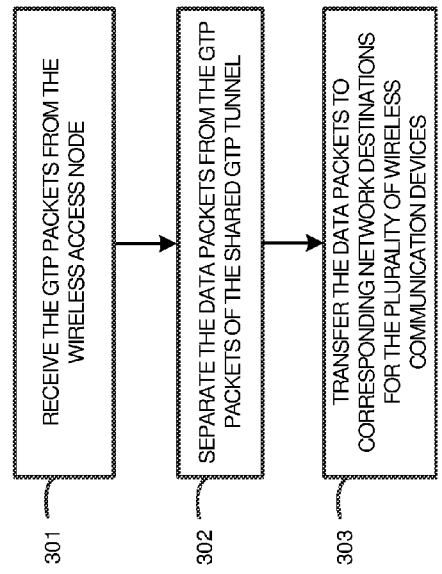
FIG. 3 illustrates a method of operating a wireless gateway to demultiplex data communications in GPRS Tunneling Protocol (GTP) for multiple wireless communication devices according to one implementation.

Referring now to FIG. 3, FIG. 3 illustrates a method of operating a wireless gateway to demultiplex data communications in GTP for multiple wireless communication devices according to one implementation. The operations of FIG. 3 are referenced parenthetically in the paragraphs that follow with reference to the systems and elements of communication system 100 in FIG. 1. In particular, the GTP operations will be described with reference wireless gateway 125, although it should be understood that other gateways may exist within an LTE network. Further, the operations of FIG. 3 are described with reference to GTP packets being transferred to wireless relay node 122, although it should be understood that similar operations could be applied to GTP packets transferred to wireless access node 120.

As previously described in FIG. 2, wireless access nodes, including wireless relay nodes, may multiplex data packets from WCDs 110-112 into GTP packets and transfer the packets over the network to a wireless gateway of the wireless network. The wireless gateway receives the GTP packets from the wireless access node (301), and separates the data packets from the GTP packets of the shared GTP tunnel (302). Accordingly, although data packets for WCDs 110-112 may be multiplexed into GTP packets for a shared GTP tunnel, the data packets are separated or demultiplexed by the wireless gateway based on information provided in the GTP extension headers of the GTP packets. For example, the GTP extension header may include information about the number of communications from the wireless devices and the length of each communication for each wireless device, wherein this information may be used by the gateway to determine which data in the GTP packet belongs to which data packet from the wireless devices. Once the data packets are separated or demultiplexed from the GTP packet, the wireless gateway may forward the data packets to the corresponding network destination (303). Accordingly, each WCD in WCDs 110-112 would have their communication forwarded to the appropriate destination device or service or service over network 135.

Although illustrated in the examples of FIGS. 2 and 3 as transferring data from WCDs 110-112 over network 135, it should be understood that similar operations may be used to transfer data to WCDs 110-112. These operations may include, receiving data at a wireless gateway of the wireless network, encapsulating the data in a GTP packet of the shared GTP tunnel for WCDs 110-112, and transferring the GTP packet to wireless relay node 122. Once received, wireless relay node 122 may separate the data for each of the devices by demultiplexing the GTP message, and transmit the data to the appropriate WCD of WCDs 110-112.

Figure 4:
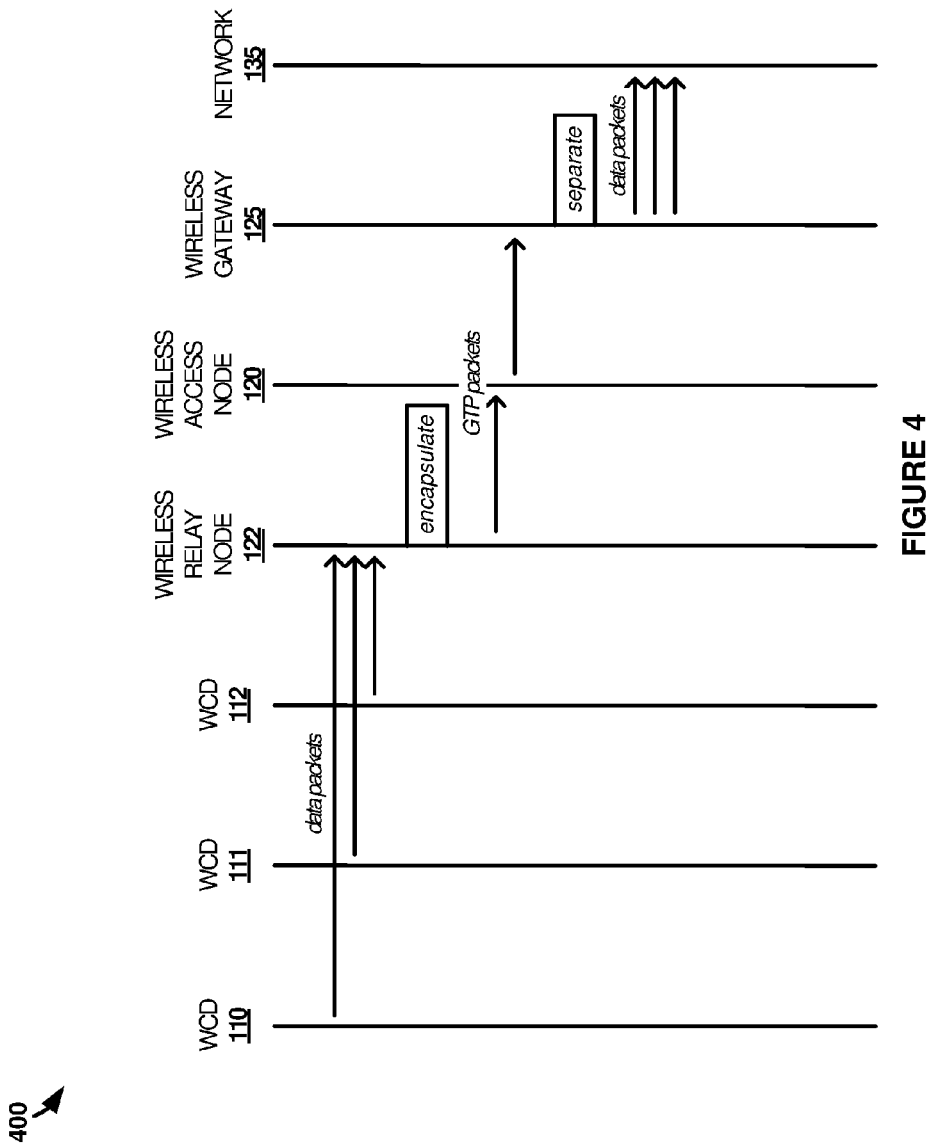
FIG. 4 illustrates a timing diagram of transferring data communications using GPRS Tunneling Protocol (GTP) extension headers and multiplexing according to one implementation.

FIG. 4 illustrates a timing diagram 400 of transferring data communications using GTP extension headers and multiplexing according to one implementation. Timing diagram 400 includes systems and elements of communication system 100 of FIG. 1. Timing diagram 400 provides an example of multiplexing using a wireless relay node, however, it should be understood that similar operations may be used by any wireless access node of a wireless network, including wireless access node 120.

As depicted, WCDs 110-112 transfer data packets to wireless relay node 122, wherein the data packets may comprise data communications for any application or process executing on the individual devices. Once received, wireless relay node 122 encapsulates the data packets into GTP packets of a shared GTP tunnel for WCDs 110-112, wherein the GTP packets each comprise a GTP extension header to multiplex the data packets from WCDs 110-112. For example, if a data packet were received from each of WCDs 110-112, rather than using a separate GTP tunnel for each of the packets, wireless relay node 122 may multiplex the data packets into a packet of a shared GTP tunnel.

As the data packets are encapsulated, the encapsulated GTP packets are transferred over wireless access node 120 to wireless gateway 125. Once received by wireless gateway 125, the gateway separates the individual data packets contained within the GTP packets and forwards the data packets over the network to their corresponding destination. In some implementations, wireless gateway 125 may process the GTP extension header provided with the GTP packets to determine which data packets correspond to which communication. For example, the extension header may include information about the length of data packets that correspond to a particular communication, the number of different communications, and other information to differentiate the data packets for different communications.

Figure 5:
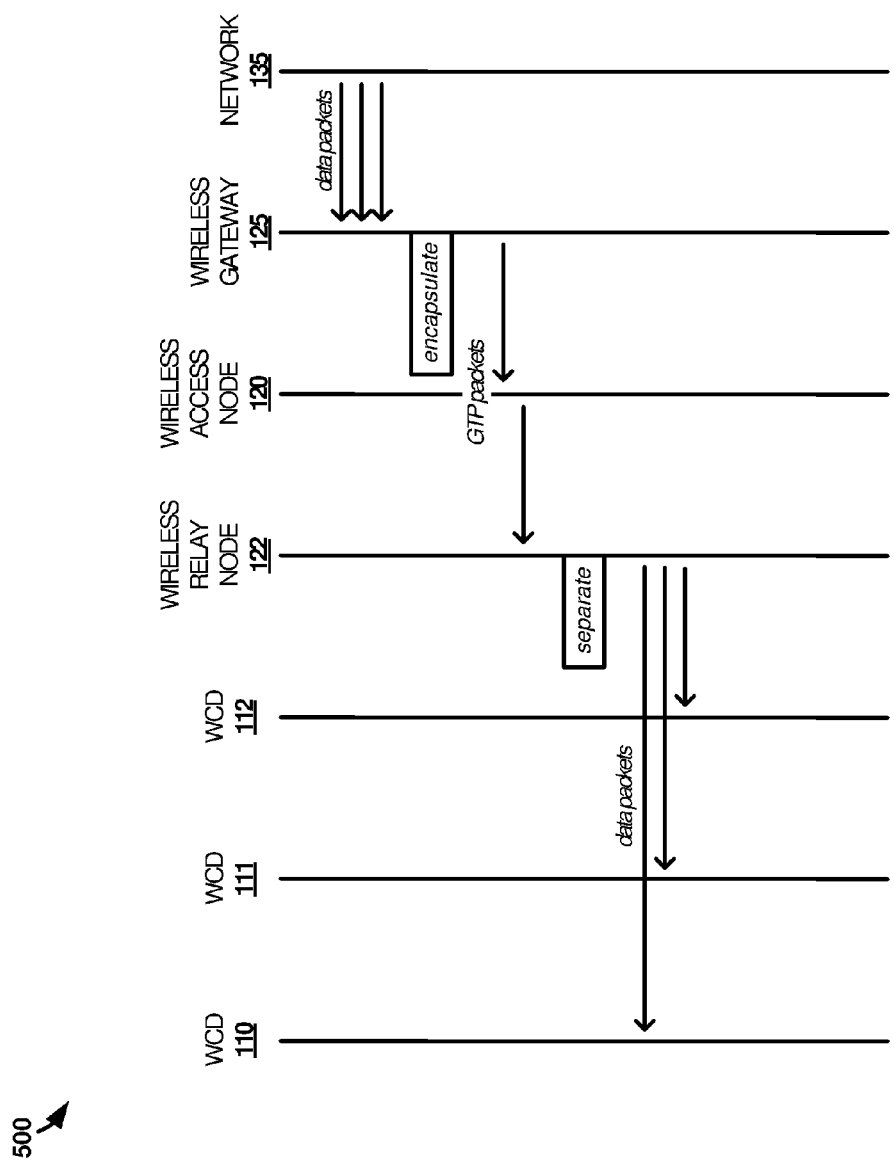
FIG. 5 illustrates a timing diagram of transferring data communications using GPRS Tunneling Protocol (GTP) extension headers and multiplexing according to one implementation.

FIG. 5 illustrates a timing diagram 500 of transferring data communications using GTP extension headers and multiplexing according to one implementation. Timing diagram 500 includes systems and elements of communication system 100 of FIG. 1. Timing diagram 500 provides an example of multiplexing data packets at a wireless gateway and providing the multiplexed packets to a wireless relay node. Although illustrated with providing multiplexed GTP packets between a wireless gateway and a wireless relay node in the present implementation, it should be understood that similar operations may be applied between a wireless gateway and a macro wireless access node, such as wireless access node 120.

As depicted, data packets are received from network 135 at wireless gateway 125. In response to receiving the packets, wireless gateway 125 encapsulates the data packets into GTP packets for a GTP tunnel shared by WCDs 110-112, wherein the GTP packets each include a GTP extension header to multiplex the data packets into GTP packets of a shared GTP tunnel. Once the GTP packets are generated, wireless gateway 125 transfers the GTP packets over wireless access node 120 for delivery at wireless relay node 122. Once received by wireless relay node 122, wireless relay node 122 will separate the data packets for the different communications, based on the GTP extension header, and transmit the data packets to the appropriate device. Accordingly, although communications for WCDs 110-112 may be received within the same GTP packet, wireless relay node may demultiplex the data packets and distribute the data packets to the appropriate device.

Figure 6:
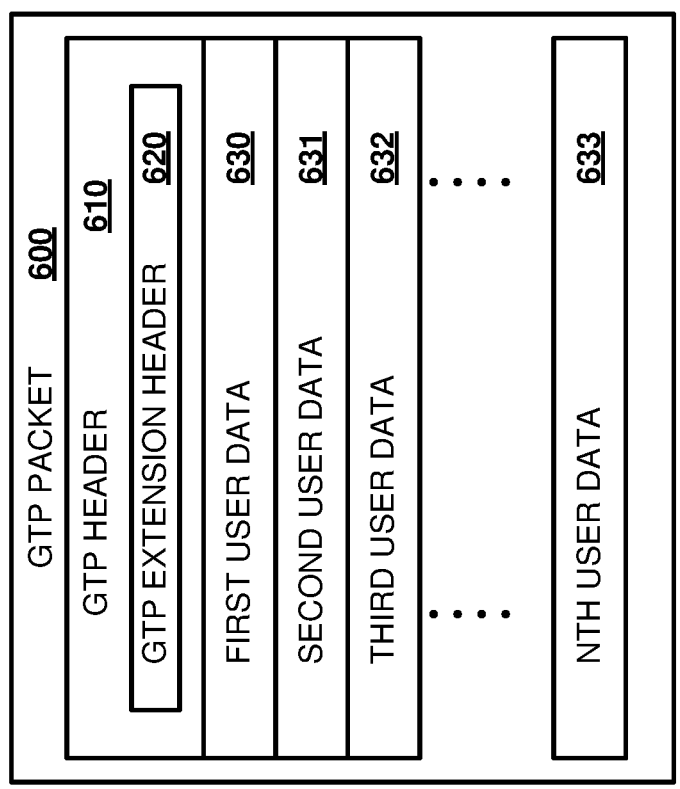
FIG. 6 illustrates a GPRS Tunneling Protocol (GTP) packet according to one implementation.

FIG. 6 illustrates a GTP packet 600 according to one implementation. GTP packet 600 includes GTP header 610 with GTP extension header 620, and further includes user data 630-633 which corresponds to data packets for wireless devices.

As described herein, between wireless access nodes and wireless gateways of a wireless service provider, GTP may be used to tag and transfer data. Here, rather than using separate tunnels and GTP packets per communication for the wireless devices, a wireless access node and corresponding gateway of the wireless service provider may multiplex multiple communications and data packets into a single GTP packet. In particular, using a wireless access node as an example, when data packets are received from multiple devices, the wireless access node may encapsulate the data in GTP packet 600 and add a GTP extension header 620, permitting data packets from multiple devices to share the same GTP packet. GTP extension header 620 provides metadata indicating which packets belong to which communication. Thus, when received by the appropriate wireless gateway of the wireless network, which may comprise a serving gateway or a packet data network gateway in some examples, the individual user data 630-633 for the various communications may be separated and forwarded to the appropriate destination system or service.

Figure 7:
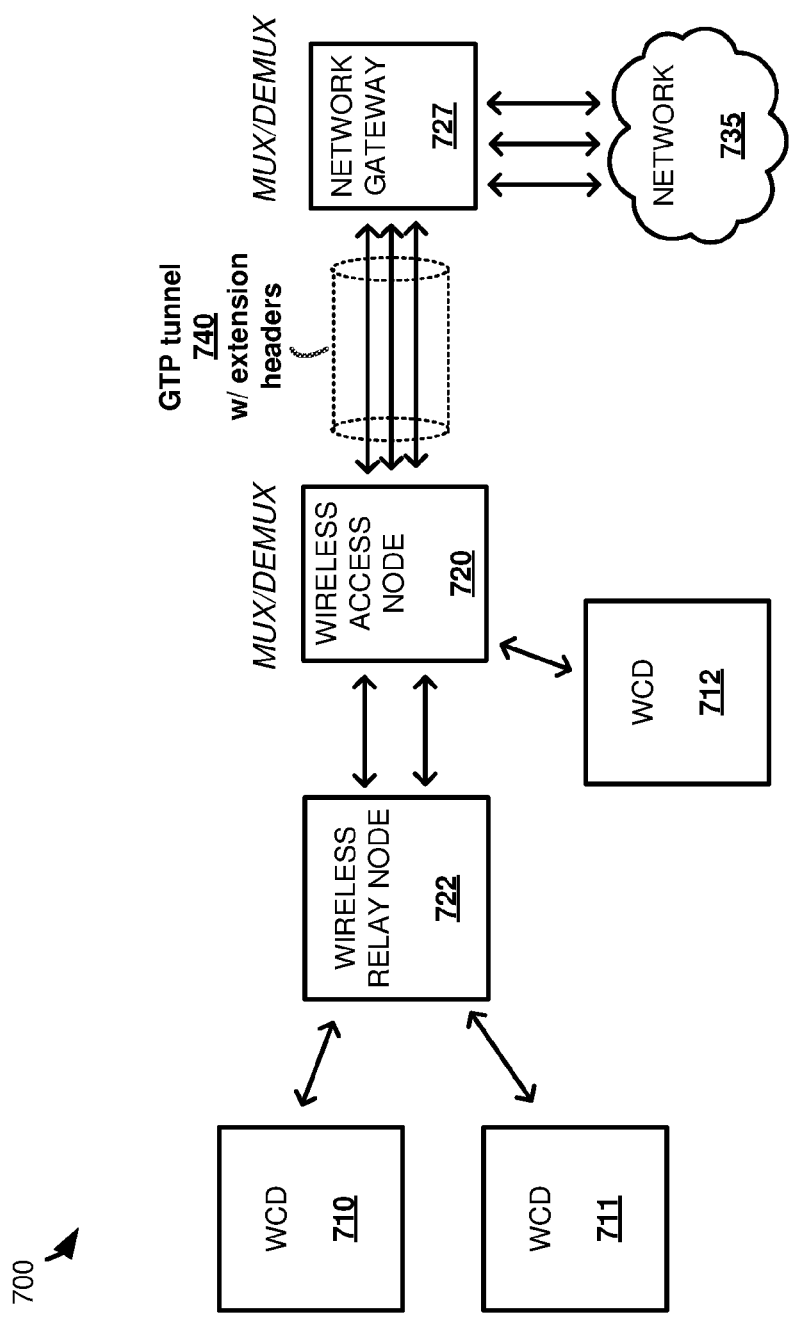
FIG. 7 illustrates an operational scenario of transferring data communications over a communication network according to one implementation.

FIG. 7 illustrates an operational scenario 700 of transferring data communications over a communication network according to on implementation. Operational scenario 700 includes WCDs 710-712, wireless relay node 722, wireless access node 720, network gateway 727, and network 735. Although illustrated in the present implementation with a single network gateway, it should be understood that a wireless service provider may provide a plurality of network gateways, including serving gateways, packet data network gateways, and the like.

In the present example, wireless access node 720 provides wireless signaling to wireless relay node 722 and WCD 712, and wireless relay node 722 acts as an intermediary access node and provides wireless signaling to WCDs 710-711. To provide the required communications to WCD 712 and wireless relay node 722, wireless access node 720 communicates with network gateway 727 using GTP tunneling, wherein the GTP tunneling is used to multiplex/demultiplex data packets for wireless relay node 722 and WCD 712. In particular, when data packets are received from WCD 712 and wireless relay node 722, which services WCDs 710-711, wireless access node 720 will encapsulate the data packets into GTP packets of a shared GTP tunnel 740 for the communications. In encapsulating the data packets, wireless access node 720 will generate an extension header for each GTP packet, which includes metadata permitting a network gateway to extract or demultiplex the data packets from the GTP packet. As the packets are encapsulated, the GTP packets are then transferred over one or more routers and/or other network gateways to network gateway 727.

Once received by network gateway 727, network gateway 727 separates the data packets from the GTP packets based on the included extension headers, and forwards the data packets to the appropriate destinations over network 735. Accordingly, although communications for WCDs 710-712 may be received within a single GTP packet, the communication packets may be separated for each of the devices and forwarded to the appropriate destination device.

Similarly, data packets may also be received by network gateway 727 from network 735 to be provided to wireless devices in the network. In response to receiving the data packets from network 735, the packets are encapsulated in GTP packets to be transferred to a wireless access node of the wireless network, wherein the GTP packets include GTP extension headers that provide metadata to multiplex the received data packets into a shared GTP tunnel. As the packets are encapsulated, network gateway 727 will transfer the GTP packets for delivery to wireless access node 720.

Once the GTP packets are received at wireless access node 720, wireless access node 720 processes the GTP packets to separate the data packets for each of the wireless devices. To separate the data packets, wireless access node 720 may use the metadata included in the GTP extension headers to identify which portions of a GTP packet belong to which data communication. For example, a first portion of the GTP packet payload may belong to a communication for WCD 112, while a second portion of the same GTP packet payload may belong to a communication from one of WCDs 110-111. As the data packets are separated for the connected wireless devices to wireless access node 720, the data packets may be transferred or transmitted to their corresponding wireless device or, in this case, wireless relay node.

Figure 8:
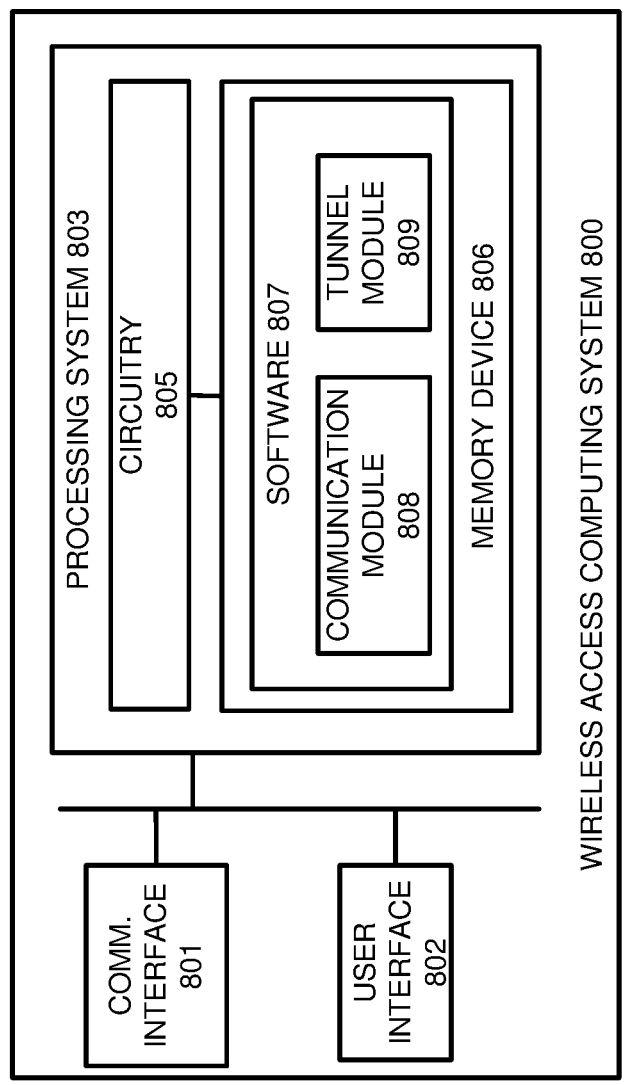
FIG. 8 illustrates a wireless access computing system according to one implementation.

FIG. 8 illustrates a wireless access computing system 800 according to one implementation. Wireless access computing system 800 is representative of any computing system or systems with which the various operational architectures, processes, scenarios, and sequences disclosed herein for a wireless access node or a wireless relay node may be implemented. Wireless access computing system 800 is an example of wireless relay nodes 122 and 722, wireless access nodes 120 and 720, or any other wireless access or relay node capable of GTP tunneling. Wireless access computing system 800 comprises communication interface 801, user interface 802, and processing system 803. Processing system 803 is linked to communication interface 801 and user interface 802. Processing system 803 includes processing circuitry 805 and memory device 806 that stores operating software 807. Wireless access computing system 800 may include other well-known components such as a battery and enclosure that are not shown for clarity.

Communication interface 801 comprises components that communicate over communication links, such as network cards, ports, radio frequency (RF) transceivers, processing circuitry and software, or some other communication devices. Communication interface 801 may be configured to communicate over metallic, wireless, or optical links. Communication interface 801 may be configured to use Time Division Multiplex (TDM), Internet Protocol (IP), Ethernet, optical networking, wireless protocols, communication signaling, or some other communication format—including combinations thereof. In particular, communication interface 801 communicates with various wireless devices using wireless signaling, wherein the wireless devices may include end WCDs or wireless relay nodes. Communication interface 801 may further communicate with a network gateway of the wireless service provider. This communication with the network gateway may come via wired communication or may use, in part, wireless signaling over one or more second wireless access nodes.

User interface 802 comprises components that interact with a user to receive user inputs and to present media and/or information. User interface 802 may include a speaker, microphone, buttons, lights, display screen, touch screen, touch pad, scroll wheel, communication port, or some other user input/output apparatus—including combinations thereof. User interface 802 may be omitted in some examples.

Processing circuitry 805 comprises microprocessor and other circuitry that retrieves and executes operating software 807 from memory device 806. Memory device 806 comprises a non-transitory storage medium, such as a disk drive, flash drive, data storage circuitry, or some other memory apparatus. Processing circuitry 805 is typically mounted on a circuit board that may also hold memory device 806 and portions of communication interface 801 and user interface 802. Operating software 807 comprises computer programs, firmware, or some other form of machine-readable program instructions. Operating software 807 includes communication module 808 and tunnel module 809, although any number of software modules may provide the same operation. Operating software 807 may further include an operating system, utilities, drivers, network interfaces, applications, or some other type of software. When executed by processing circuitry 805, operating software 807 directs processing system 803 to operate wireless access computing system 800 as described herein.

In at least one implementation, communication module 808, when read and executed by processing system 803, directs processing system 803 to receive data packets, via communication interface 801 from wireless communication devices. These data packets may include IP packets wirelessly transmitted from end user wireless devices, as well as data packets transferred from other wireless access nodes (or wireless relay nodes). As the packets are received from the various devices, tunnel module 809 directs processing system 803 to encapsulate the data packets from the wireless communication devices into GTP packets of a shared GTP tunnel for the wireless communication devices, wherein the GTP packets comprise extension headers to multiplex the data packets in the GTP packets. Thus, rather than having a separate GTP tunnel for each of the communications from the wireless devices, wireless access computing system 800 may use a shared tunnel for multiple devices.

While the GTP packets are generated, communication module 808 further directs processing system 803 to transfer the GTP packets for delivery to a wireless network gateway. In some implementations, the GTP packets may be transferred to the network gateway without the use of a second wireless access node. However, when wireless access computing system 800 comprises a relay node, it should be understood that communication module 808 may direct processing system 803 to transfer the GTP packets to a macro wireless access node, which in turn forwards the packets to the network gateway.

Similar to the operations described above for multiplexing the data packets from the wireless devices, computing system 800 may further demultiplex GTP packets that are received from the wireless network gateway. In particular, communication module 808 directs processing system 803 to receive GTP packets of the shared GTP tunnel. Once received, tunnel module 809 directs processing system 803 to separate data packets from the GTP packets based on extension headers in the GTP packets. After the data packets are separated, the data packets are forwarded to their corresponding wireless communication device.

Figure 9:
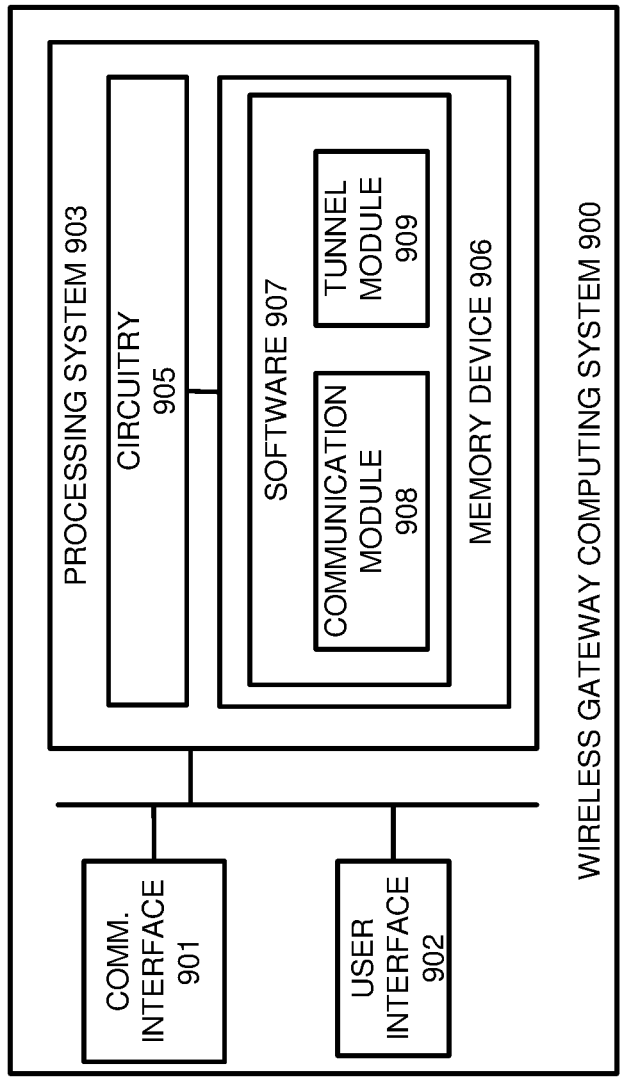
FIG. 9 illustrates a wireless gateway computing system according to one implementation.

FIG. 9 illustrates a wireless gateway computing system 900 according to one implementation. Wireless gateway computing system 900 is representative of any computing system or systems with which the various operational architectures, processes, scenarios, and sequences disclosed herein for a wireless gateway may be implemented. Wireless gateway computing system 900 is an example of wireless gateway 125 and wireless gateway 727, although other examples may exist. Wireless gateway computing system 900 comprises communication interface 901, user interface 902, and processing system 903. Processing system 903 is linked to communication interface 901 and user interface 902. Processing system 903 includes processing circuitry 905 and memory device 906 that stores operating software 907. Wireless gateway computing system 900 may include other well-known components such as a battery and enclosure that are not shown for clarity.

Communication interface 901 comprises components that communicate over communication links, such as network cards, ports, radio frequency (RF) transceivers, processing circuitry and software, or some other communication devices. Communication interface 901 may be configured to communicate over metallic, wireless, or optical links. Communication interface 901 may be configured to use Time Division Multiplex (TDM), Internet Protocol (IP), Ethernet, optical networking, wireless protocols, communication signaling, or some other communication format—including combinations thereof. In particular, communication interface 901 is used to transfer and receive GTP packets with a wireless access node of the wireless network. This wireless access node may comprise a macro wireless access node or eNodeB, or may comprise a relay wireless access node of the wireless network.

User interface 902 comprises components that interact with a user to receive user inputs and to present media and/or information. User interface 902 may include a speaker, microphone, buttons, lights, display screen, touch screen, touch pad, scroll wheel, communication port, or some other user input/output apparatus—including combinations thereof. User interface 902 may be omitted in some examples.

Processing circuitry 905 comprises microprocessor and other circuitry that retrieves and executes operating software 907 from memory device 906. Memory device 906 comprises a non-transitory storage medium, such as a disk drive, flash drive, data storage circuitry, or some other memory apparatus. Processing circuitry 905 is typically mounted on a circuit board that may also hold memory device 906 and portions of communication interface 901 and user interface 902. Operating software 907 comprises computer programs, firmware, or some other form of machine-readable program instructions. Operating software 907 includes communication module 908 and tunnel module 909, although any number of software modules may provide the same operation. Operating software 907 may further include an operating system, utilities, drivers, network interfaces, applications, or some other type of software. When executed by processing circuitry 905, operating software 907 directs processing system 903 to operate wireless gateway computing system 900 as described herein.

In at least one implementation, wireless gateway computing system 900 provides GTP tunneling operations as described herein. In particular, communication module 908 directs processing system 903 to receive, via communication interface 901, GTP packets transferred from a wireless access node of the wireless network. In response to receiving the GTP packets, tunnel module 909 directs processing system 903 to separate the data packets multiplexed therein based on a head extension provided with each of the GTP packets. Once the data packets are separated, communication module 908 directs processing system 903 to forward the separated data packets to each of their respective network destinations using communication interface 901.

Similar to the operations described above, communication module 908 may further direct processing system 903 to receive, via communication interface 901, data packets from services and end systems of the network to be delivered to wireless communication devices. In response to receiving the data packets, tunnel module 909 directs processing system 903 to encapsulate the data packets into GTP packets of a shared GTP tunnel for the wireless communication devices, wherein the GTP packets include GTP extension headers capable providing metadata to multiplex the data packets for multiple communications in a single GTP packet. Once the data packets are encapsulated in the GTP packets, the GTP packets are then forwarded to the appropriate wireless access node using communication interface 901.

Figure 10:
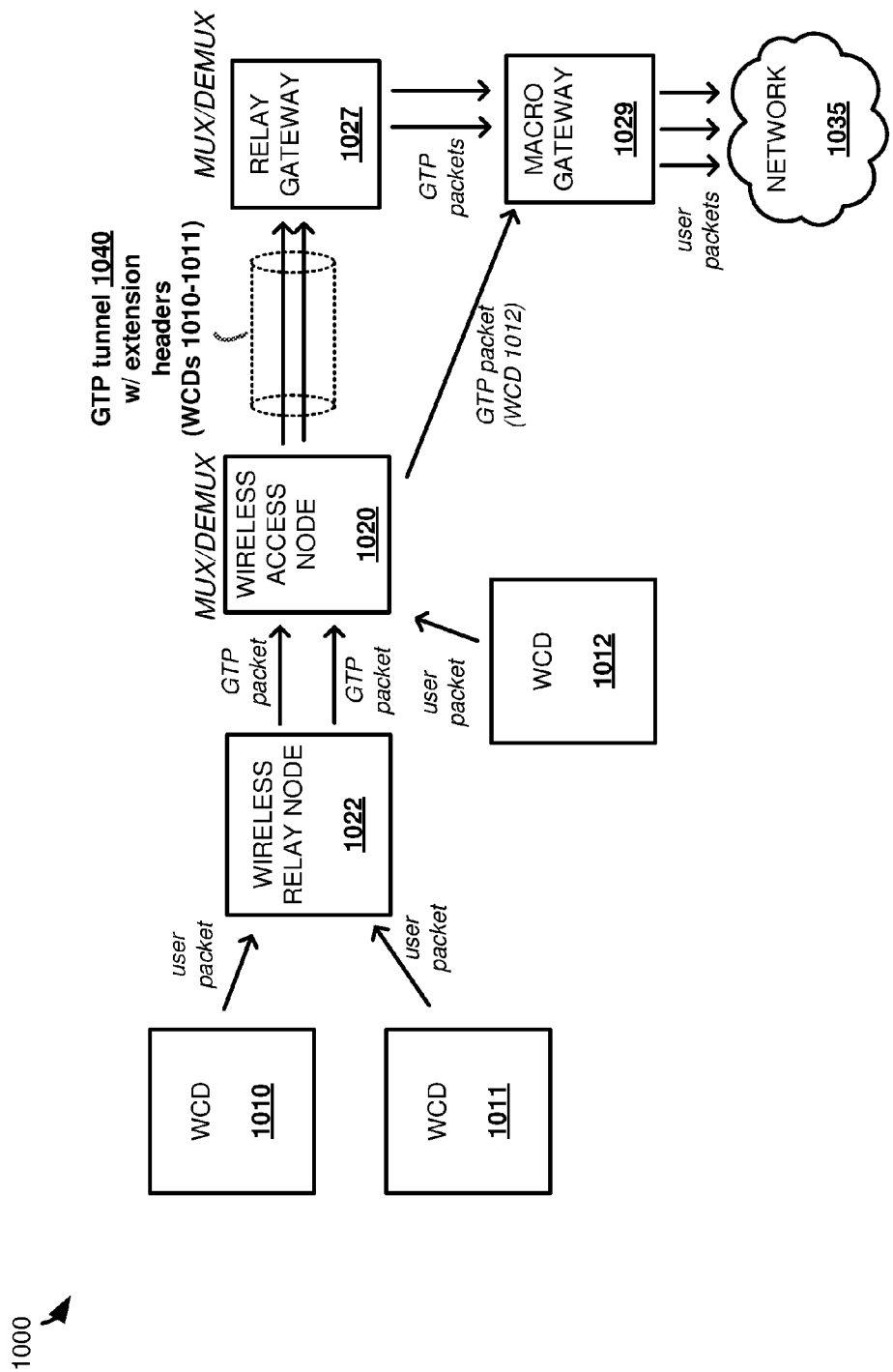
FIG. 10 illustrates an operational scenario of transferring data communications over a communication network according to one implementation.

FIG. 10 illustrates an operational scenario 1000 of transferring data communications over a communication network according to one implementation. Operational scenario 1000 includes WCDs 1010-1012, wireless relay node 1022, wireless access node 1020, relay gateway 1027, macro gateway 1029, and network 1035. Relay gateway 1027 is representative of a relay gateway to provide data routing over for wireless relay node 1022, and macro gateway 1029 is representative of a gateway to provide data routing for wireless access node 1020.

Here, unlike the previous examples described herein, wireless access node 1020 provides the multiplexing operations and demultiplexing operations for device communications that were received at wireless relay node 1022. In particular, wireless relay node 1022 is configured to receive data packets from WCDs 1010-1011. In response to receiving the data packets, wireless relay node 1022 will generate GTP packets for each of the data packets and forward the GTP packets as wireless signaling to wireless access node 1020. Once received by wireless access node 1020, wireless access node 1020 will encapsulate the GTP packets corresponding to WCDs 1010 and 1011 into a second GTP tunnel 1040 that corresponds to wireless relay node 1022. This second GTP tunnel 1040 is used to multiplex the plurality of GTP packets for WCDs 1010-1011 into a single GTP packet that corresponds to wireless relay node 1022. In particular, this second GTP packet may include a GTP extension header, which could indicate the number of WCD GTP packets in the shared GTP packet, the size of each of the GTP packets in the shared GTP packet, the offset of each of the GTP packets in the shared GTP packet, or any other similar information.

Once the shared GTP packet is generated by wireless access node 1020, the packet is transferred over the network to relay gateway 1027 that provides routing operations for wireless relay node 1022. In response to receiving the shared GTP packet, relay gateway 1027 will demultiplex the shared GTP packet based on the extension header provided therein. This demultiplexing permits relay gateway 1027 to separate the individual GTP packets for WCDs 1010-1011, and provide the individual GTP packets to macro gateway 1029. Macro gateway 1029, which corresponds to a serving or packet data network gateway for wireless access node 1020, extracts the user data from the individual GTP packets, and transfers the data over network 1035 to the required destination.

In addition to providing communications to wireless relay node 1022 in operational scenario 1000, wireless access node 1020 further receives a user packet from WCD 1012. In response to receiving the packet, a GTP packet is generated for the user packet and, unlike the packets from wireless relay node 1022, the GTP packet is forwarded to macro gateway 1029 without processing by relay gateway 1027. Further, because the user packet was not received by wireless relay node 1022, the packet is not multiplexed into the shared GTP tunnel that is provided to relay gateway 1027. Once the GTP packet for WCD 1012 is transferred to macro gateway 1029, the user data may be extracted and forwarded over network 1035 to the required destination.

Although illustrated as data being transferred over the wireless network from WCDs 1010-1012, it should be understood that similar operations may be used to transfer data to the wireless devices. In particular, relay gateway 1027 may be used to generate shared GTP packets with GTP extension headers for second GTP packets that require delivery to WCDs 1010-1011. Wireless access node 1020 may then be used to demultiplex the individual GTP packets for WCDs 1011 and transfer the individual GTP packets to wireless relay node 1022 for end delivery to WCDs 1011.

Figure 11:
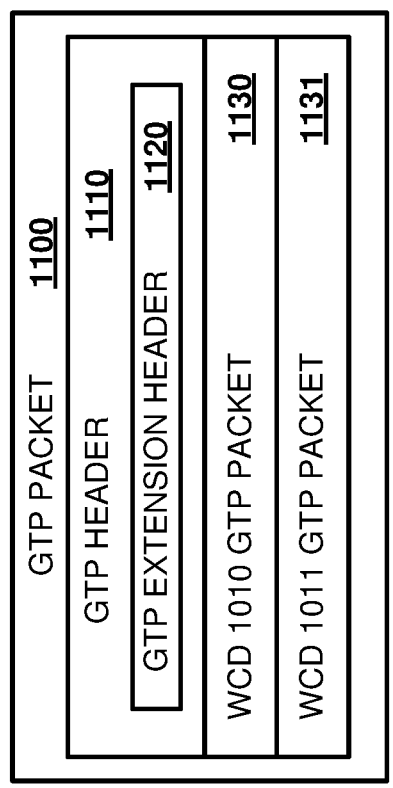
FIG. 11 illustrates a GPRS Tunneling Protocol (GTP) packet according to one implementation.

FIG. 11 illustrates a GTP packet 1100 according to one implementation. GTP packet 1100 is representative of a packet that could be generated by wireless access node 1020 for GTP tunnel 1040. GTP packets 1100 includes GTP header 1110, WCD 1010 GTP packet 1130, and WCD 1011 GTP packet 1131.

As described in FIG. 10, wireless relay node 1022 transfers GTP packets that correspond to data communications from WCDs 1010-1011. In response to receiving the GTP packets for the end WCDs, wireless access node 1020 multiplexes the GTP packets into a shared GTP tunnel that is used to multiplex the GTP communications for the WCDs into a single tunnel for wireless relay node 1022. Here, a GTP packet 1100 in the shared tunnel includes GTP header 1110 with GTP extension header 1120, and further includes WCD GTP packets 1130-1131. GTP extension header 1120 is used to define the locations of the WCD GTP packets within the overarching GTP packet 1100, wherein the header may include information about the length of each of the GTP packets, the number of total GTP packets, the size of each of the GTP packets, or any other similar information. This information can then be used in separating the WCD GTP packets, reducing the amount of processing power that is required to parse GTP packet 1100 to identify the individual GTP packets included therein.

Returning to the elements of FIG. 1, WCDs 110-112 each comprise Radio Frequency (RF) communication circuitry and an antenna. The RF communication circuitry typically includes an amplifier, filter, modulator, and signal processing circuitry. WCDs 110-112 may each include a user interface, memory device, software, processing circuitry, or some other communication components. WCDs 110-112 may comprise telephones, computers, e-books, mobile Internet appliances, wireless network interface cards, media players, game consoles, or some other wireless communication apparatus, including various combinations thereof.

Wireless access node 120 comprises RF communication circuitry and at least one antenna to provide wireless communication services to wireless relay node 122. The RF communication circuitry typically includes an amplifier, filter, RF modulator, and signal processing circuitry. Wireless access node 120 may comprise a router, server, memory device, software, processing circuitry, cabling, power supply, network communication interface, structural support, or some other communication apparatus.

Wireless relay node 122 comprises RF communication circuitry and at least one antenna to provide wireless communication services to first and second WCDs 110-112 and to communicate with wireless access node 120. The RF communication circuitry typically includes an amplifier, filter, RF modulator, and signal processing circuitry. Wireless relay node 122 may comprise a router, server, memory device, software, processing circuitry, cabling, power supply, network communication interface, structural support, or some other communication apparatus.

Wireless gateway 125 may comprise one or more computing systems capable of routing and managing communications across the LTE network. Wireless gateway 125 may include processing systems, storage systems, communication interfaces, user interfaces, and other similar computing systems. Wireless gateway 125 may comprise a serving gateway, a packet data network gateway, a relay serving gateway, a relay packet data network gateway, or some other similar gateway for the wireless network. In some implementations, the gateways for relay nodes and macro access node may be separated into separate gateways. Thus, wireless relay node 122 may be allocated one or more separate gateways than wireless access node 120.

Network 135 may comprise the wireless service provider network and may further include data service networks, such as the Internet, IMS, or some other network that provides data services to first and second WCDs 110-111. Communication network 135 may comprise switches, wireless access nodes, Internet routers, network gateways, application servers, computer systems, communication links, or some other type of communication equipment—including combinations thereof.

Wireless signaling 145 uses wireless links that use the air or space as transport media for LTE wireless communication format. Wireless signaling 146 uses wireless links that use the air or space as transport media for LTE, WiFi, or some other wireless communication format. Communication links 140-141 could use various communication protocols, such as Time Division Multiplex (TDM), Internet Protocol (IP), Ethernet, communication signaling, wireless communication signaling, or some other communication format—including combinations thereof. Communication links 140-141 could be direct links or may include intermediate networks, systems, or devices. For example, between wireless access node 120 and wireless gateway 125, one or more routers and alternative network gateways may be included in communication link 140.

The included descriptions and figures depict specific implementations to teach those skilled in the art how to make and use the best option. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

What is claimed is:

1. A method of operating a wireless communication network that uses a General Purpose Radio Service Tunneling Protocol (GTP), the method comprising:

a wireless access node wirelessly exchanging first user data with first wireless communication devices;

wireless relays wirelessly exchanging second user data with second wireless communication devices;

the wireless access node and a network gateway exchanging the first user data in first GTP packets;

the wireless relays and the wireless access node wirelessly exchanging the second user data in second GTP packets;

the wireless access node multiplexing and demultiplexing the second GTP packets into individual GTP tunnels for individual ones of the wireless relays, wherein the individual GTP tunnels for the individual wireless relays have individual GTP extension headers with multiplexing information for the second user data;

a relay gateway multiplexing and demultiplexing the second GTP packets into the individual GTP tunnels for the individual wireless relays;

the wireless access node and the relay gateway exchanging the second GTP packets over the individual GTP tunnels for the individual wireless relays; and the relay gateway and the network gateway exchanging the second user data in the second GTP packets.

2. The method of claim 1 wherein the multiplexing information for the second user data defines locations of the second user data in the individual GTP tunnels.

3. The method of claim 1 wherein the network gateway comprises a packet data network gateway.

4. A wireless communication network that uses a General Purpose Radio Service Tunneling Protocol (GTP), the wireless communication network comprising:

a wireless access node configured to wirelessly exchange first user data with first wireless communication devices;

wireless relays configured to wirelessly exchange second user data with second wireless communication devices;

the wireless access node and a network gateway configured to exchange the first user data in first GTP packets;

the wireless relays and the wireless access node configured to wirelessly exchange the second user data in second GTP packets;

the wireless access node configured to multiplex and demultiplex the second GTP packets into individual GTP tunnels for individual ones of the wireless relays, wherein the individual GTP tunnels for the individual wireless relays have individual GTP extension headers with multiplexing information for the second user data;

a relay gateway configured to multiplex and demultiplex the second GTP packets into the individual GTP tunnels for the individual wireless relays;

the wireless access node and the relay gateway configured to exchange the second GTP packets over the individual GTP tunnels for the individual wireless relays; and the relay gateway and the network gateway configured to exchange the second user data in the second GTP packets.

5. The wireless communication network of claim 4 wherein the multiplexing information for the second user data defines locations of the second user data in the individual GTP tunnels.

6. The wireless communication network of claim 4 wherein the network gateway comprises a packet data network gateway.

* * * * *